United States Patent
Duan et al.

(10) Patent No.: US 11,765,439 B2
(45) Date of Patent: Sep. 19, 2023

(54) INTELLIGENT COMMENTARY GENERATION AND PLAYING METHODS, APPARATUSES, AND DEVICES, AND COMPUTER STORAGE MEDIUM

(71) Applicant: TENCENT TECHNOLOGY (SHENZHEN) COMPANY LIMITED, Shenzhen (CN)

(72) Inventors: Hong Duan, Shenzhen (CN); Caisheng Ouyang, Shenzhen (CN); Qi Chen, Shenzhen (CN); Yang Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 73 days.

(21) Appl. No.: 17/500,558

(22) Filed: Oct. 13, 2021

(65) Prior Publication Data

US 2022/0038790 A1    Feb. 3, 2022

Related U.S. Application Data

(63) Continuation of application No. PCT/CN2020/122438, filed on Oct. 21, 2020.

(30) Foreign Application Priority Data

Dec. 12, 2019    (CN) .......................... 201911275221.9

(51) Int. Cl.
*H04N 21/23*    (2011.01)
*H04N 21/81*    (2011.01)
(Continued)

(52) U.S. Cl.
CPC ......... *H04N 21/8133* (2013.01); *G06V 20/42* (2022.01); *G06V 20/48* (2022.01);
(Continued)

(58) Field of Classification Search
None
See application file for complete search history.

(56) References Cited

U.S. PATENT DOCUMENTS

| 2013/0322856 | A1   | 12/2013 | Oh |
|---|---|---|---|
| 2018/0357508 | A1 * | 12/2018 | Cui .......................... G06N 3/08 |
| 2019/0354805 | A1   | 11/2019 | Hind et al. |

FOREIGN PATENT DOCUMENTS

| CN | 104391960 A | 3/2015 |
|---|---|---|
| CN | 106776523 A | 5/2017 |

(Continued)

OTHER PUBLICATIONS

The World Intellectual Property Organization (WIPO) International Search Report for PCT/CN2020/122438 dated Jan. 11, 2021 6 Pages (including translation).
(Continued)

*Primary Examiner* — Cai Y Chen
(74) *Attorney, Agent, or Firm* — ANOVA LAW GROUP PLLC

(57) ABSTRACT

The present disclosure provides an intelligent commentary generation method. The method includes: obtaining a match data stream; parsing the match data stream, to obtain candidate events from the match data stream; determining events from the candidate events, to generate a sequence of events; and generating commentary scripts corresponding to the match data stream according to the sequence of events.

17 Claims, 9 Drawing Sheets

(51) Int. Cl.
*G06V 20/40* (2022.01)
*G10L 13/02* (2013.01)
*H04N 21/234* (2011.01)

(52) U.S. Cl.
CPC ....... *G10L 13/02* (2013.01); *H04N 21/23418* (2013.01); *G06V 20/44* (2022.01)

(56) References Cited

FOREIGN PATENT DOCUMENTS

| | | |
|---|---|---|
| CN | 107423274 A | 12/2017 |
| CN | 107707931 A | 2/2018 |
| CN | 108337573 A | 7/2018 |
| CN | 108549486 A | 9/2018 |
| CN | 108888947 A | 11/2018 |
| CN | 109118562 A | 1/2019 |
| CN | 109145733 A | 1/2019 |
| CN | 109671429 A | 4/2019 |
| CN | 110971964 A | 4/2020 |
| WO | 2019220260 A1 | 11/2019 |

OTHER PUBLICATIONS

The State Intellectual Property Office of the People's Republic of China (SIPO) Office Action 1 for for 201911275221.9 dated Jan. 26, 2021 12 Pages (including translation).
The State Intellectual Property Office of the People's Republic of China (SIPO) Office Action 2 for for 201911275221.9 Aug. 4, 2021 17 Pages (including translation).

\* cited by examiner

INTELLIGENT COMMENTARY GENERATION AND PLAYING METHODS, APPARATUSES, AND DEVICES, AND COMPUTER STORAGE MEDIUM

RELATED APPLICATION(S)

This application is a continuation application of PCT Patent Application No. PCT/CN2020/122438 filed on Oct. 21, 2020, which claims priority to Chinese Patent Application No. 201911275221.9, entitled "INTELLIGENT COMMENTARY GENERATION AND PLAYING METHODS, APPARATUSES, AND DEVICES, AND COMPUTER STORAGE MEDIUM" filed on Dec. 12, 2019, all of which are incorporated by reference in entirety.

FIELD OF THE TECHNOLOGY

The present disclosure relates to the technical field of Internet, and in particular, to intelligent commentary generation and playing methods, apparatuses, and devices, and a computer storage medium.

BACKGROUND

With the development of Internet technologies and intelligent terminals, entertainment methods have changed greatly. Intelligent terminals may be employed to view news, watch videos, listen to music, and play online games, or watch game videos of e-sports players in e-sports competitions, live videos and broadcast videos of sports competitions, or the like anytime and anywhere. However, commentaries may be needed for some non-professional users to better understand competition situations and have an enhanced understanding of the competitions when watching game videos and sports competition videos.

A competition commentator can make a wonderful and more accurate commentary on a competition after having had a detailed understanding of all types of data in the competition process (data storage and memory) and analyzing all types of events in the competition process in real time (real-time data analysis), combined with the understanding of various modes of the competition (mode recognition).

At present, competition commentators may include official commentators and anchor commentators. There are usually a few of designated official commentators, and the number of competitions on commentating is limited.

SUMMARY

Embodiments of the present disclosure provide an intelligent commentary generation and playing methods and apparatuses, and a computer storage medium, capable of generating commentary data based on a match data stream, which can improve the commenting efficiency.

The technical solutions in the embodiments of the present disclosure are implemented as follows:

In one aspect, the present disclosure provides an intelligent commentary generation method, applied to an intelligent commentary generation device, the method including: obtaining a match data stream; parsing the match data stream, to obtain candidate events from the match data stream; determining events from the candidate events, to generate a sequence of events; and generating commentary scripts corresponding to the match data stream according to the sequence of events.

In another aspect, the present disclosure provides an intelligent commentary generation apparatus including: a memory storing computer program instructions; and a processor coupled to the memory and configured to execute the computer program instructions and perform: obtaining a match data stream; parsing the match data stream, to obtain candidate events from the match data stream; determining events from the candidate events, to generate a sequence of events; and generating commentary scripts corresponding to the match data stream according to the sequence of events.

In yet another aspect, the present disclosure provides a non-transitory computer-readable storage medium storing computer program instructions executable by at least one processor to perform: obtaining a match data stream; parsing the match data stream, to obtain candidate events to be commented on from the match data stream; determining events from the candidate events, to generate a sequence of events; and generating commentary scripts corresponding to the match data stream according to the sequence of events.

In yet another aspect, the present disclosure provides an intelligent commentary playing method, applied to an intelligent commentary playing device, the method including: obtaining, in response to an operation instruction of playing a match video, a match video stream; obtaining commentary scripts corresponding to a match data stream that matches the match video stream; playing the match video according to the match video stream; and synchronously outputting, based on time information corresponding to the match video which is currently played, the commentary scripts corresponding to the time information.

In yet another aspect, the present disclosure provides an intelligent commentary generation apparatus, including: a first obtaining module, configured to obtain a match data stream; a first parsing module, configured to parse the match data stream, to obtain candidate events from the match data stream; a first determining module, configured to determine events from the candidate events, to generate a sequence of events; and a first generation module, configured to generate commentary scripts corresponding to the match data stream according to the sequence of events n.

Other aspects of the present disclosure can be understood by those skilled in the art in light of the description, the claims, and the drawings of the present disclosure.

The embodiments of the present disclosure have the following beneficial effects:

In the intelligent commentary generation method provided by the embodiments of the present disclosure, after obtaining a match data stream, the match data stream is parsed, to perform a recognition process from the match data stream to events, to obtain candidate events from the match data stream, to further determine events from the candidate events, to generate a sequence of events; and commentary scripts corresponding to the match data stream are generated according to the sequence of events. In this way, the commentary data can be more automatically and more accurately generated according to the match data stream, so that the commenting efficiency and the commenting accuracy can be improved.

BRIEF DESCRIPTION OF THE DRAWINGS

To facilitate a better understanding of technical solutions of certain embodiments of the present disclosure, accompanying drawings are described below. The accompanying drawings are illustrative of certain embodiments of the present disclosure, and a person of ordinary skill in the art may still derive other drawings from these accompanying drawings without having to exert creative efforts. When the following descriptions are made with reference to the accompanying drawings, unless otherwise indicated, same numbers in different accompanying drawings may represent same or similar elements. In addition, the accompanying drawings are not necessarily drawn to scale.

DETAILED DESCRIPTION

Figure 1:
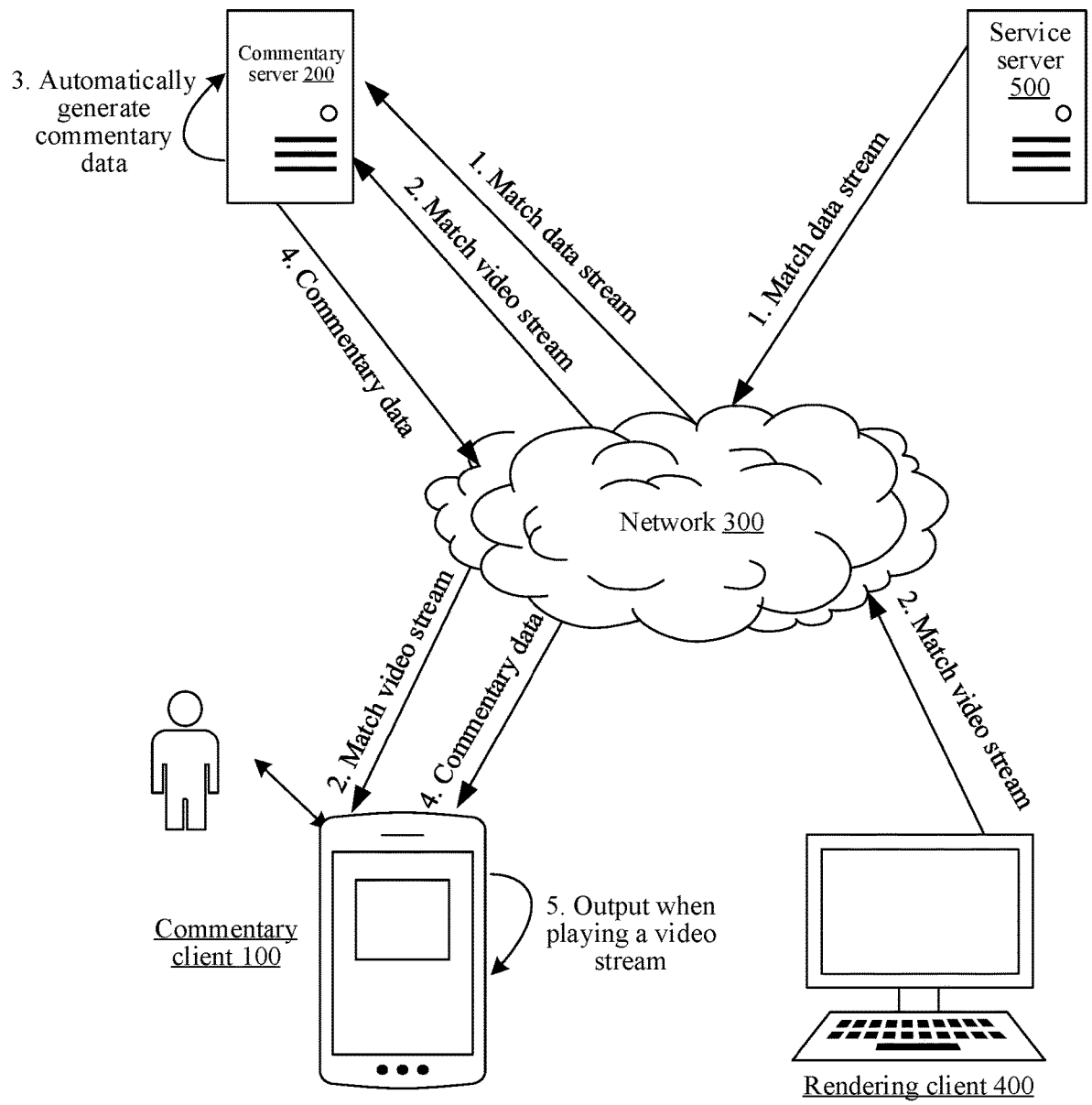
FIG. 1 is a schematic diagram of a network architecture of intelligent commentary generation and playing methods according to one or more embodiments of the present disclosure.

To make objectives, technical solutions, and/or advantages of the present disclosure more comprehensible, certain embodiments of the present disclosure are further elaborated in detail with reference to the accompanying drawings. The embodiments as described are not to be construed as a limitation to the present disclosure. All other embodiments obtained by a person of ordinary skill in the art without creative efforts shall fall within the protection scope of embodiments of the present disclosure.

Throughout the description, and when applicable, "some embodiments" or "certain embodiments" describe subsets of all possible embodiments, but it may be understood that the "some embodiments" or "certain embodiments" may be the same subset or different subsets of all the possible embodiments, and can be combined with each other without conflict.

In certain embodiments, the term "based on" is employed herein interchangeably with the term "according to."

In the following descriptions, the included term "first/second/third" is merely intended to distinguish similar objects but does not necessarily indicate a specific order of an object. The term "first/second/third" is interchangeable in terms of a specific order or sequence if permitted, so that the embodiments of the present disclosure described herein can be implemented in a sequence in addition to the sequence shown or described herein.

Unless otherwise defined, meanings of all technical and scientific terms used in the present disclosure are the same as those usually understood by a person skilled in the art to which the present disclosure belongs. Terms used in the present disclosure are merely intended to describe objectives of the embodiments of the present disclosure, but are not intended to limit the present disclosure.

Before the embodiments of the present disclosure are described, nouns and terms involved in the embodiments of the present disclosure are described. The nouns and terms provided in the embodiments of the present disclosure are applicable to the following explanations.

1) Multiplayer Online Battle Arena (MOBA): The gameplay of such the game is: players may need to purchase equipment in battle, and are usually divided into two teams. The two teams compete with each other in a scattered game map, and each player controls the selected character through an RTS-style interface.

2) Text To Speech (TTS): The TTS is a type of speech synthesis implementation, which converts files stored in a computer, such as help files or web pages, into a natural speech output.

3) Match data stream: The match data stream refers to a code stream which is formed by encoding a plurality of match data frames in the competitive match and is suitable for transmission in a network.

4) Match video stream: The match video stream refers to a code stream which is formed by encoding a plurality of match video frames and is suitable for transmission in a network.

Exemplary implementations of the apparatus that implements the embodiments of the present disclosure are described below, and the apparatus provided by the embodiments of the present disclosure may be implemented as a terminal device. An exemplary implementation covering a terminal device when the apparatus is implemented as a terminal device will be described below.

Referring to FIG. 1, FIG. 1 is a schematic diagram of a network architecture of an intelligent commentary generation method according to an embodiment of the present disclosure. As shown in FIG. 1, the network architecture includes at least a commentary client 100, a commentary server 200, a network 300, a rendering client 400, and a service server 500. To support an exemplary implementation, the commentary client 100 is connected to the commentary server 200 through the network 300, the commentary server 200 is connected to the rendering client 400 and the service server 500 through the network 300, the rendering client 400 is connected to the service server 500 through the network 300, and the network 300 may be a wide area network, a local area network, or a combination of the two, or data transmission is implemented by using a wireless link.

The commentary server 200 obtains a match data stream from the service server 500 and obtains a match video stream from the rendering client 400, and further the commentary server 200 automatically generates commentary data based on the match data stream and the match video stream and transmits the commentary data to the commentary client 100. The commentary client 100 may obtain and buffer the match video stream from the rendering client 400 in advance, further play the match video stream when the commentary data is received, and synchronously output the commentary data when a commentary time point is arrived.

The commentary server 200 and the service server 500 should not be simply understood as one or a class of servers, but rather as various possible forms of servers deployed to support implementations or web pages in practical implementations according to the described examples.

For example, the commentary server 200 or the service server 500 may be a stand-alone physical server, or may be a server cluster or distributed system formed by multiple physical servers, or may be a cloud server providing basic cloud computing services such as cloud services, cloud databases, cloud computing, cloud functions, cloud storage, network services, cloud communication, middleware services, domain name services, security services, CDN, and big data and artificial intelligence platforms.

The apparatus provided by the embodiments of the present disclosure may be implemented in hardware or a combination of software and hardware and various exemplary implementations of the apparatus provided by the embodiments of the present disclosure are described below.

Other exemplary structures of the commentary server 200 can be predicted according to the exemplary structure of the commentary server 200 shown in FIG. 2, and therefore the structure described herein should not be regarded as limiting, for example, some of the components described below may be omitted, or components not described below may be added to adapt to special requirements of some implementations.

Figure 2:
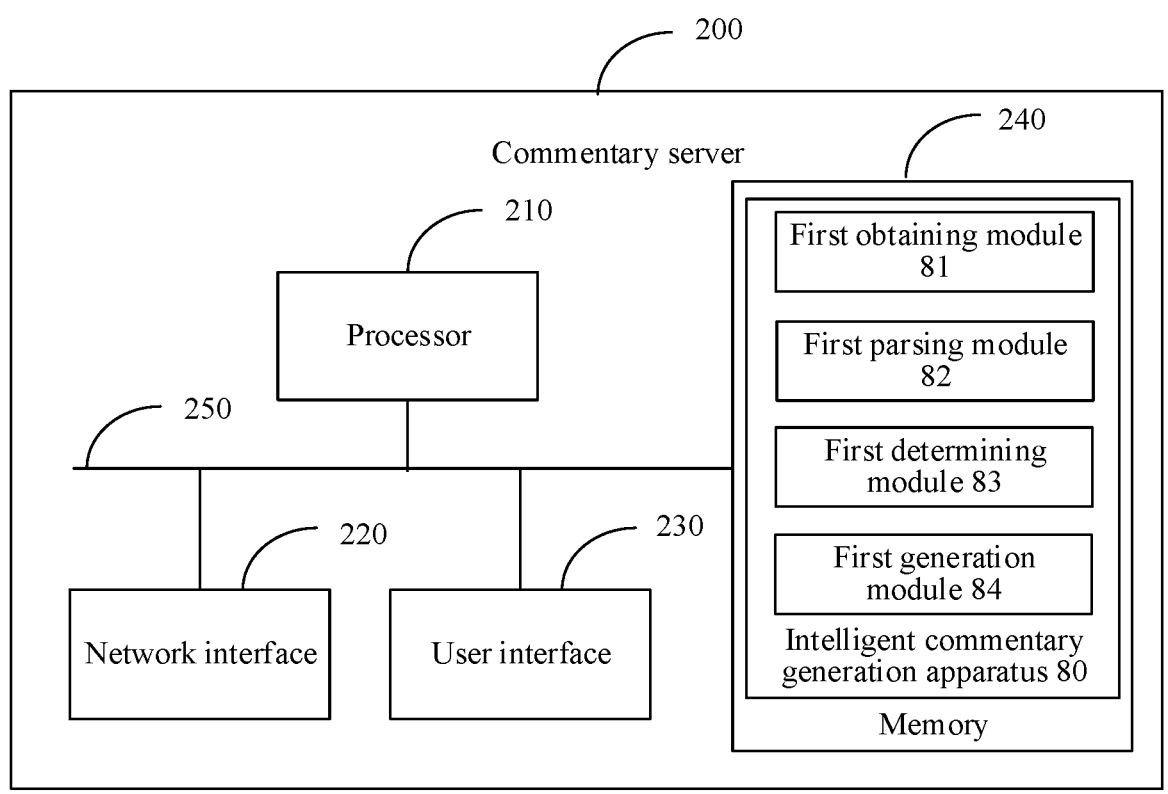
FIG. 2 is a schematic structural diagram of components of a commentary server 200 according to one or more embodiments of the present disclosure.

The commentary server 200 shown in FIG. 2 includes at least one processor 210, a memory 240, at least one network interface 220, and a user interface 230. All the components in the commentary server 200 are coupled together by using a bus system 250. The bus system 250 is configured to implement connection and communication between these components. In addition to a data bus, the bus system 250 further includes a power supply bus, a control bus, and a status signal bus. However, for ease of clear description, all types of buses are marked as the bus system 250 in FIG. 2.

The user interface 230 may include a display, a keyboard, a mouse, a touch pad, a touch screen, or the like.

The memory 240 may be a volatile memory or a non-volatile memory, or may include a volatile memory and a non-volatile memory. The non-volatile memory may be a read-only memory (ROM). The volatile memory may be a random-access memory (RAM). The memory 240 described in the embodiments of the present disclosure is to include any other suitable type of memories.

The memory 240 in the embodiments of the present disclosure is capable of storing data to support the operation of commentary server 200. Examples of these data include: any computer program, such as an operating system and an application program, operated on the commentary server 200. The operating system includes various system programs, for example, a framework layer, a core library layer, and a driver layer, and is used for implementing various basic services and processing a hardware-related task. The application may include various applications.

As an example of software implementation of the method provided by the embodiments of the present disclosure, the method provided by the embodiments of the present disclosure may be directly embodied as a combination of software modules executed by the processor 210. The software module may be located in a storage medium that is located in the memory 240 where the processor 210 reads executable instructions included in the software module to accomplish the methods provided by the embodiments of the present disclosure in combination with desirable hardware (for example, including the processor 210 and other components connected to the bus 250).

As an example, the processor 210 may be an integrated circuit chip having a signal processing capability, for example, a general purpose processor, a digital signal processor (DSP), or another programmable logic device, discrete gate, transistor logical device, or discrete hardware component. The general purpose processor may be a microprocessor, any conventional processor, or the like.

The intelligent commentary generation and playing methods provided by the embodiments of the present disclosure are described below in combination with the exemplary implementation of the terminal provided by the embodiments of the present disclosure.

To better understand the methods provided by the embodiments of the present disclosure, artificial intelligence, various branches of the artificial intelligence, and implementation fields related to the methods provided by the embodiments of the present disclosure are first described.

Artificial intelligence (AI) is a theory, method, technology, and implementation system that uses a digital computer or a machine controlled by the digital computer to simulate, extend, and expand human intelligence, perceive an environment, obtain knowledge, and use knowledge to obtain an optimal result. In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. The basic AI technology generally includes a technology such as a sensor, a dedicated AI chip, cloud computing, distributed storage, a big data processing technology, an operation/interaction system, or mechatronics. An AI software technology may include fields such as a CV technology, a speech processing technology, a natural language processing technology, and machine learning/deep learning (DL). The directions are described below.

Computer vision (CV) is a science that studies how to enable a machine to "see". Furthermore, the CV means that using a camera and a computer to replace human eyes to perform machine vision such as recognition, tracking, and measurement on a target, and further performing graphic processing, so that the computer processes the target into an image more suitable for human eyes to observe, or into an image to be transmitted to an instrument for detection. As a scientific subject, the CV studies related theories and technologies and attempts to establish an artificial intelligence (AI) system that can obtain information from images or multidimensional data. The CV technologies generally include technologies such as image processing, image recognition, image semantic understanding, image retrieval, optical character recognition (OCR), video processing, video semantic understanding, video content/behavior recognition, three-dimensional (3D) object reconstruction, a 3D technology, virtual reality, augmented reality, synchronous positioning, and map construction, and further include biological feature recognition technologies such as common face recognition and fingerprint recognition.

Key technologies of the speech technology include an automatic speech recognition (ASR) technology, a text-to-speech (TTS) technology, and a voiceprint recognition technology. To make a computer capable of listening, seeing, speaking, and feeling is the future development direction of human-computer interaction, and speech has become one of the most promising human-computer interaction methods in the future.

Natural language processing (NLP) is an important direction in the fields of computer science and AI. NLP studies various theories and methods for implementing effective communication between human and computers through natural languages. NLP is a science that integrates linguistics, computer science and mathematics. Therefore, studies in this field relate to natural languages, that is, languages used by people in daily life, and NLP is closely related to linguistic studies. The NLP technology generally includes technologies such as text processing, semantic understanding, machine translation, robot question and answer, and knowledge graph.

Machine learning (ML) is a multi-field interdiscipline and relates to a plurality of disciplines such as the probability theory, statistics, the approximation theory, convex analysis, and the algorithm complexity theory. ML specializes in studying how a computer simulates or implements a human learning behavior to acquire new knowledge or skills, and reorganize an existing knowledge structure, so as to keep improving its performance. The ML, as the core of AI, is a basic way to make the computer intelligent, and is applicable to various fields of AI. ML and DL usually include technologies such as artificial neural network, belief network, reinforcement learning, transfer learning, and inductive learning.

With the research and progress of the AI technology, the AI technology is studied and applied in a plurality of fields such as a common smart home, a smart wearable device, a virtual assistant, a smart speaker, smart marketing, unmanned driving, automatic driving, an unmanned aerial vehicle, a robot, smart medical care, and smart customer service. It is believed that with the development of technologies, the AI technology will be applied to more fields, and play an increasingly important role.

The solution provided by the embodiments of the present disclosure relates to the technologies related to AI natural language processing, and is described by the following embodiments.

Figure 3:
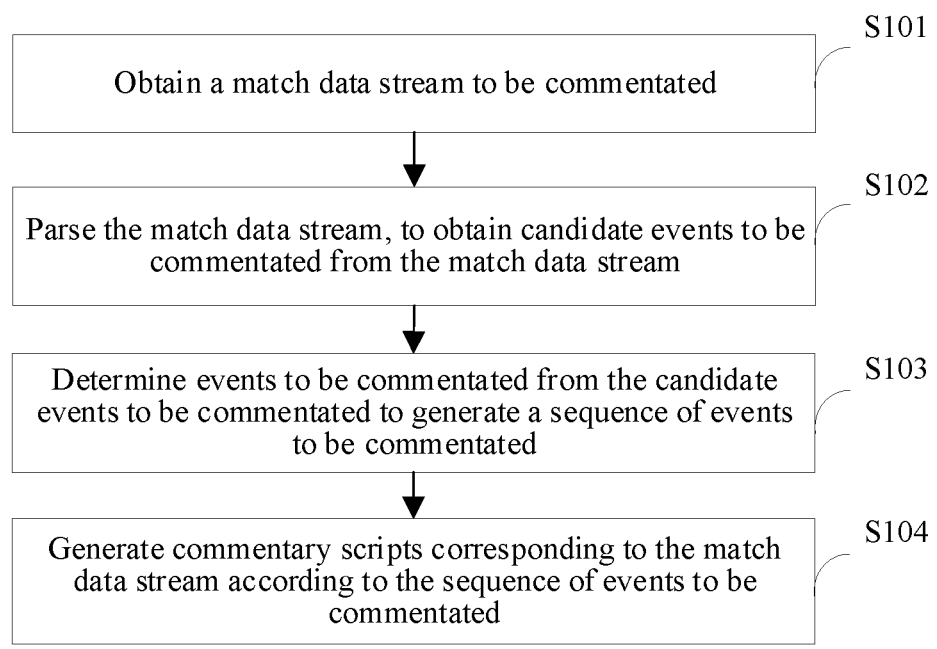
FIG. 3 is a schematic flowchart of an implementation of an intelligent commentary generation method according to one or more embodiments of the present disclosure.

Referring to FIG. 3, FIG. 3 is a schematic flowchart of an implementation of an intelligent commentary generation method according to an embodiment of the present disclosure, being applied in an intelligent commentary generation device. In this embodiment of the present disclosure, the intelligent commentary generation device is the commentary server shown in FIG. 1, and description is provided in combination with the steps shown in FIG. 3.

Step S101. Obtain a match data stream to be commented on or commentated on.

In certain embodiments of the present disclosure, the term "comment," "comments," "commenting," and "commented" is respectively interchangeable with the term "commentate," "commentates," "commentating," and "commentated."

Here, the match data stream refers to a code stream which is formed by encoding the match data and suitable for transmission in a network. In this embodiment and other embodiments of the present disclosure, a match video stream can be rendered by using the match data stream. In addition, the match data stream includes a plurality of match data frames, and the match video stream includes a plurality of match video frames.

The implementation of step S101 may include: obtaining, by the commentary server, the match data stream from the service server, where the match data stream may be a data stream of a match event in real time or a data stream of a historical match event.

Step S102. Parse the match data stream, to obtain candidate events to be commented on from the match data stream.

Here, the implementation of step S102 may include: parsing the match data stream of a period of time, and determining candidate events to be commented on that are included in the match data stream by using a preset event matching strategy. The preset event matching strategy may include data desirable to be generated, an action desirable to be performed, or the like when a preset event occurs. When or in response to determining that the match data stream is parsed by using the preset event matching strategy and it is determined that the match data stream includes data desirable to be generated when a preset event occurs, or When or in response to determining that the match data stream is parsed by using the preset event matching strategy and it is detected that a specific action corresponding to a preset event is carried out, it is considered that a candidate event to be commented on is recognized.

For example, when it is determined by analyzing the match data stream that all five heroes in the red side are marching towards the same place, which accords with an event matching strategy of multi-player group battle opening, it is considered that a preset event of multi-player group battle opening is recognized. In addition, when it is detected that a hero is carrying out jungling during the marching, it is considered that a preset event of carrying out jungling is also recognized. Generally, when parsing the match data stream, a plurality of preset events may be recognized.

In this embodiment of the present disclosure, at least an identifier of a candidate event to be commented on that accords with an event matching strategy is recognized, and the identifier of the event may be an event name, for example, the event name may be "multi-player group battle opening", "blue buff reclaiming", "blue buff giving", "shooting", or the like. In some embodiments, to more accurately generate a commentary text and subsequent commentary data, it is also desirable to obtain attribute information such as occurrence places of the candidate events to be commented on and corresponding persons (characters). The attribute information of the preset events may be obtained by parsing the match data stream. For example, the recognized candidate events to be commented on may be "multi-player group battle opening", "the red side", or "the third turret".

The obtained match data stream is schematically illustrated by step S102, and various events that can be intuitively understood by the audience can be obtained by abstracting and generalizing a bottom match data stream, thereby providing a desirable data basis for a subsequent process of generating commentary content.

Step S103. Determine events to be commented on from the candidate events to be commented on, to generate a sequence of events to be commented on.

Here, in this embodiment of the present disclosure, a plurality of candidate events to be commented on may be obtained through matching by using a match data stream in a same time period. In addition, obviously, commenting can be performed on only one event to be commented on in one time period, and therefore it is desirable to select the event to be commented on from the plurality of candidate events to be commented on that are obtained through matching in the same time period, to comment on the event to be commented on. Therefore, the events to be commented on that are determined from different time periods of a relatively long match data stream form a sequence of events to be commented on.

Step S104. Generate commentary scripts corresponding to the match data stream according to the sequence of events to be commented on.

Here, during implementation of step S104, the commentary scripts are sequentially generated based on the events to be commented on in the sequence of events to be commented on by using preset commentary content generation strategies, where the commentary scripts each include a commentary text and a commentary time point. In some embodiments, the commentary script may further include commentary audio data, and the commentary audio data may be obtained by converting the commentary text into an audio by using the TTS technology. The commentary time point is a start time of outputting the commentary audio data. For example, the commentary time point being 05:06 represents that the commentary audio data starts to be outputted when the match video stream is played to 05:06.

In some embodiments, the commentary data may further include expression information, action information, shape of mouth information, or the like used during playing of the commentary audio data.

Through step S101 to step S104, the commentary data may be automatically generated by parsing and making decisions based on the match data stream, which not only can improve the popularity of commentaries, but also can ensure the commenting accuracy.

In some embodiments, the implementation of step S102 to step S104 may be: inputting the match data stream to be processed to a trained commentary script generation model for processing, to obtain the commentary scripts. By using the trained commentary script generation model, recognition of preset events, extraction of events to be commented on, and generation of commentary scripts may be implemented, and training data of the commentary script generation model may include real commentary data of historical events and may further include knowledge arranged by professional commentators.

In some embodiments, after step S104, the method further includes: transmitting the commentary scripts to a client, where the client refers to a commentary client. After receiving the commentary data, the commentary client plays the match video stream, and outputs the commentary text and the commentary audio data when the commentary time point is arrived. In some embodiments of the present disclosure, the commentary text may be used as a commentary subtitle, and the commentary audio data may be synchronously outputted by using an audio output apparatus.

In the intelligent commentary generation method provided by the embodiments of the present disclosure, after obtaining the match data stream to be processed, the process of recognizing candidate events to be commented on from the match data stream is performed by parsing the match data stream, the sequence of events to be commented on is extracted from the plurality of candidate events to be commented on, and then the commentary scripts corresponding to the sequence of events to be commented on are generated. In this way, the commentary data can be more automatically and more accurately generated according to the match data stream, so that the commenting efficiency and the commenting accuracy can be improved.

In some embodiments, step S103 "Determine events to be commented on from the candidate events to be commented on, to generate a sequence of events to be commented on" may be implemented by step S1031 to step S1033. The following describes the steps.

Step S1031. Obtain time periods in which the candidate events to be commented on occur and importance degree parameters of the candidate events to be commented on.

In this embodiment of the present disclosure, the importance degree parameter of each candidate event to be commented on is a parameter used for representing a degree of importance of the candidate event to be commented on, and may be determined according to a degree of impact of the candidate event to be commented on the game match. A higher importance degree parameter of the candidate event to be commented on indicates a higher probability at which the candidate event to be commented on is determined as an event to be commented on. In some embodiments, the importance degree parameter of each candidate event to be commented on may alternatively be determined based on real historical commentary data and a corresponding match data stream. For example, a plurality of candidate events to be commented on may be recognized from match data streams corresponding to real commentary data, events commented-on by commentators are determined based on the real commentary data, and therefore it can be concluded that the events commented on by the commentators have the highest importance degree parameter. Through the analysis of a large number of real historical commentary data and corresponding match data streams, the importance degree parameter of each candidate events to be commented on can be determined.

In some embodiments, to ensure the contextual relevance of the commentary, the importance degree parameter of each candidate event to be commented on may probably further be related to the relevance degree of a previously commented-on event, that is, the importance degree parameter of each candidate event to be commented on may be determined by the importance degree parameter of this event and the relevance degree with the previously commented-on event.

Step S1032. Determine, based on the time periods in which the candidate events to be commented on occur, sets of candidate events to be commented on corresponding to the time periods.

Here, after recognizing the candidate events to be commented on and determining the time periods in which the candidate events to be commented on occur, a set of candidate events to be commented on in the same time period can be determined based on the time period in which the candidate events to be commented on occur, so that the event to be commented on can be subsequently determined from the set of candidate events to be commented on in the same time period.

Step S1033. Determine, based on the importance degree parameters of the candidate events to be commented on, events to be commented on corresponding to the time periods from the sets of candidate events to be commented on corresponding to the time periods, to obtain the sequence of events to be commented on.

The implementation of step S1033 may be: determining, based on the importance degree parameters of the candidate events to be commented on, events to be commented on that satisfy event extraction conditions from the sets of candidate events to be commented on corresponding to the time periods, to obtain the sequence of events to be commented on. During implementation, the event extraction conditions may be: having the highest importance degree parameter, that is, the candidate event to be commented on having the highest importance degree parameter in the same time period is determined as the event to be commented on.

Through step S1031 to step S1033, events to be commented on in the time periods can be determined from the recognized plurality of candidate events to be commented on, to obtain a sequence of events to be commented on corresponding to the match data stream, so that the commentary scripts can be generated by using the sequence of events to be commented on.

In some embodiments, step S104 shown in FIG. 3 may be implemented through step S1041 to step S1044 below. Relevant description is provided below in combination with the steps.

Step S1041. Obtain attribute information of each event to be commented on in the sequence of events to be commented on.

Here, when describing an event, it is not enough to get only the name of the event, it is further desirable to determine a place and a person of the event. Therefore, the attribute information includes at least the place where the event to be commented on occurs and character information corresponding to the event to be commented on.

In some embodiments, the attribute information of the event to be commented on can be obtained by parsing the match data stream. For example, the attribute information of an event to be commented on may include: "multi-player group battle opening", "the red side", and "the third turret", where the "multi-player group battle opening" is the identifier of the event to be commented on, the "the red side" is the character information corresponding to the event to be commented on, and the "the third turret" is the place where the events to be commented on occurs.

Step S1042. Obtain a commentary content generation strategy corresponding to each event to be commented on.

Here, the commentary content generation strategy refers to a strategy for generating a commentary text according to the attribute information of the event to be commented on. The commentary content generation strategy may be to sort the attribute information of the events to be commented on, and add mood particles, prepositions, or the like between the attribute information when desirable. For example, when the identifier of the event to be commented on is "multi-player group battle opening", the commentary content generation strategy may be to sort the attribute information of the events to be commented on according to the character information, the place of occurrence, and the identifiers of the events to be commented on, add a preposition such as "at" between the character information and the place of occurrence, add "is carrying out" between the place of occurrence and the identifier of the events to be commented on, and add "We can see that" before the character information. Different events to be commented on may correspond to different commentary content generation strategies. In some embodiments, different events to be commented on may alternatively correspond to the same commentary content generation strategy.

In this embodiment of the present disclosure, the commentary content generation strategy may be determined based on real historical commentary data. By analyzing the real historical commentary data, a commentary content used when a commentator makes a commentary on an event in a real situation can be determined, so as to perform annotation from a preset event to a commentary text, that is, the commentary content generation strategy is obtained. In addition, the commentary generation strategy may be continuously updated and optimized with the abundance of real commentary data.

Step S1043. Generate commentary texts based on the commentary content generation strategies and the attribute information.

Here, after obtaining the commentary content generation strategies and the attribute information of the events to be commented on, mapping from the events to be commented on to the commentary contents (commentary texts) can be performed, thereby obtaining the commentary texts corresponding to the events to be commented on.

Following the described example, the attribute information of the events to be commented on includes "multi-player group battle opening", "the red side", and "the third turret", and the commentary content generation strategy is: to sort, based on the character information, the place of occurrence, and the identifiers of the events to be commented on, the attribute information of the events to be commented on, add a preposition such as "at" between the character information and the place of occurrence, add "is carrying out" between the place of occurrence and the identifier of the events to be commented on, and add "We can see that" before the character information; and in this implementation, the commentary text generated based on the commentary content generation strategy and the attribute information is "We can see that the red side is carrying out multi-player group battle opening at the third turret".

Step S1044. Generate, based on the commentary texts, the commentary scripts corresponding to the events to be commented on.

Here, the commentary scripts may include commentary audio data, and in some embodiments may further include expression information and action information for deducing the commentary texts.

In the actual implementation process, step S1044 may be implemented by the following steps:

Step S10441. Convert the commentary texts into commentary audio data.

Here, the implementation of step S10441 may be converting the commentary texts into commentary audio data by using a TTS service.

Step S10442. Input the commentary texts to a trained natural language processing model for processing to obtain expression information and action information corresponding to each commentary text.

Here, the natural language processing model, that is the NLP model, may be a trained neural network model for performing natural language processing in the embodiments of the present disclosure. After obtaining the expression information and the action information, the expression information and the action information may be carried in the commentary data and transmitted to the client, so that when a virtual person service is running in the client, a virtual person may be driven to deduce the commentary data based on the expression information and the action information.

Through described step S1041 to step S1044, a plurality of events to be commented on can be mapped to the commentary texts by using the commentary content generation strategy obtained based on real historical commentary data, to obtain the commentary texts corresponding to the events to be commented on, so as to generate the commentary scripts based on the commentary texts.

In some embodiments, after step S103 or before step S104, or after or at the same time as step S104, the following steps may also be performed:

Step S031. Obtain a match video stream corresponding to the match data stream.

Here, the match video stream is rendered by using the match data stream. In some embodiments, the match video stream is obtained by rendering the match data stream by a special rendering client, that is, the implementation of step S031 may be: receiving a match video stream sent by the rendering client, where the match video stream includes a plurality of video frames.

Step S032. Determine, based on the match data stream, occurrence time points of the events to be commented on.

Here, each data frame in the match data stream carries time information, and therefore the occurrence time point of the event to be commented on can be determined according to the time information carried by the data frame corresponding to the event to be commented on.

Step S033. Determine time points in the match video stream and corresponding to the occurrence time points as commentary time points.

Here, the match video stream and the match data stream are generally from different devices, or even if the match video stream and the match data stream are from the same device, contents such as an advertisement or video introduction may be added during playing of the match video stream, which results in that the time of the match video stream is not aligned with that of the match data stream. Therefore, after determining the occurrence time points of the events to be commented on, it is further desirable to determine the time points corresponding to the occurrence time points in the match video stream as the commentary time points.

For example, when an occurrence time point of an event to be commented on is 05:06, that is, 5 minutes and 6 seconds after the match starts and it is determined that the time point of playing the video corresponding to the event at 05:06 in the match video stream is 06:16 due to insertion of an advertisement in the match video stream, that is, the commentary time point is 06:16.

Step S034. Transmit the commentary scripts and the commentary time points corresponding to the events to be commented on to a client.

Here, the commentary scripts and the commentary time points corresponding to the events to be commented on are transmitted to a client, so that the client can play corresponding commentary contents based on the commentary scripts when the commentary time points are arrived.

In the embodiments of the present disclosure, the match video stream may be from a rendering client and the match data stream may be from a service server, that is, sources of the match video stream and the match data stream are independent of each other, and there is no one-to-one correspondence between video frames and data frames. Therefore, alignment may need to be performed on the video frames and the data frames. In some embodiments, the match data stream and the match video stream may be aligned through the following steps.

Step S21. Obtain video frames from the match video stream and data frames from the match data stream.

Here, the implementation of step S21 may be: decoding the match video stream and the match data stream, to obtain the video frames from the match video stream and the data frames from the match data stream.

Step S22. Perform image recognition on the video frames, to obtain service time information corresponding to the video frames.

Here, the service time information is displayed in the same corresponding area (which may be referred to as a time display area) in each video frame, and therefore the implementation of step S22 may be: performing image recognition based on image information of pixels in the time display areas of the video frames, to obtain the service time information corresponding to the video frames.

Step S23. Obtain playing time information corresponding to the video frames.

Here, each video frame corresponds to one piece of playing time information, and generally playing time information of a video frame lags behind service time information corresponding to the video frame. The playing time information of the video frame may be determined according to a frame sequence number and a playing frame rate of the video frame. In some embodiments, When the video frames are obtained by decoding, each video frame may alternatively directly carry playing time information.

Step S24. Establish a correspondence between the service time information and the playing time information of each video frame, to perform time alignment between the match data stream and the match video stream.

Here, the service time information of the video frame is the time information carried by the data frame corresponding to the video frame, and therefore time alignment between the match data stream and the match video stream can be performed by establishing the correspondence between the service time information and the playing time information of each video frame.

There should be no long-term vacancy in commentary and deduction, and therefore when there is a relatively long vacant time between the two commentary data, some preset commentary data, such as data of an introduction of a character, an introduction of a competitive tactic, a humorous joke, or the like, may be inserted through the following steps, to ensure the coherence and context relevance of the commentaries.

Step S321. Obtain commentary durations of the events to be commented on.

Here, the commentary duration is also the playing duration of the commentary audio data. After the commentary audio data is determined, a playing duration of the commentary audio data can be determined.

Step S322. Determine a commentary time difference based on commentary time points and commentary durations corresponding to two adjacent events to be commented on.

Here, the implementation of step S322 may be: determining, according to the commentary time point and the commentary duration of the former event to be commented on in the two adjacent events to be commented on, a commentary end time point of the former event to be commented on, and then determining the commentary time difference according to the commentary time point of the latter event to be commented on and the commentary end time point of the former event to be commented on.

For example, the commentary time point of the former event to be commented on is 07:00 and the commentary duration is 10 seconds, that is, the commentary end time point of the former event to be commented on is 07:10, and the commentary time point of the latter event to be commented on is 07:35, so the commentary time difference between the two adjacent events to be commented on is 25 seconds.

Step S323. Determine a supplementary commentary script based on the two adjacent events to be commented on and the commentary time difference When or in response to determining that the commentary time difference is greater than a difference threshold.

Here, the commentary time difference being greater than the difference threshold indicates that the vacant time between two commentaries is excessively long. In this implementation, some supplementary commentary scripts may be inserted. The supplementary commentary scripts may be audio data corresponding to an introduction of a character, an introduction of a competitive tactic or the like, or corresponding to a humor joke or the like, and the time information of playing the audio data. In this embodiment of the present disclosure, the time information of playing the audio data may be the commentary end time point of the former event to be commented on, or a time point for a certain duration after the commentary end time point of the former event to be commented on, for example, may be is after the commentary end time point of the former event to be commented on.

The implementation of step S323 may be: selecting, according to the commentary time difference and the two adjacent events to be commented on, a supplementary commentary audio script having a commentary duration that does not exceed the commentary time difference. In some embodiments of the present disclosure, the supplementary commentary audio script may be correlated to the two adjacent events to be commented on.

Step S324. Transmit the supplementary commentary script to a client.

Here, the supplementary commentary script includes the supplementary commentary audio data and the corresponding commentary time point, and therefore the client may output the supplementary commentary audio data after receiving the supplementary commentary script and detecting that the commentary time point is arrived.

Through described step S321 to step S324, some supplementary commentary audio data may be adaptively selected when the vacant time between two commentaries is excessively long, which can not only avoid the embarrassment of not commenting for a long time, but also improve the interest and knowledge of the commenting.

Figure 4:
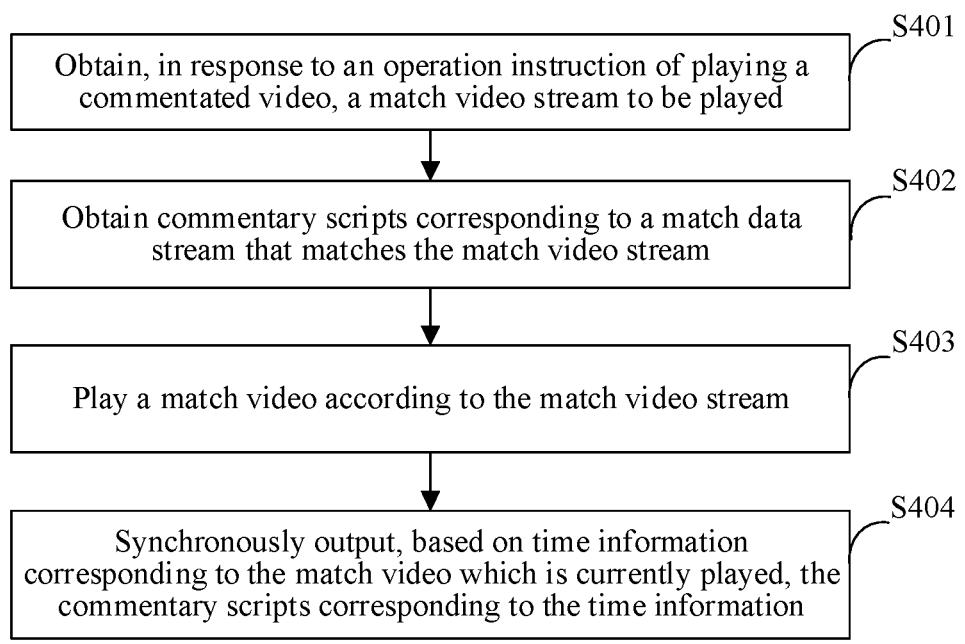
FIG. 4 is a schematic flowchart of an implementation of an intelligent commentary playing method according to one or more embodiments of the present disclosure.

An embodiment of the present disclosure provides an intelligent commentary playing method, applied to an intelligent commentary playing device, which is also the commentary client in FIG. 1. FIG. 4 is a schematic flowchart of an implementation of the intelligent commentary playing method according to an embodiment of the present disclosure. As shown in FIG. 4, the flow includes the following steps.

Step S401. Obtain, in response to an operation instruction of playing a commented-on video, a match video stream to be played.

Here, the commentary client may be a dedicated commentary client installed in a user terminal, and a user may select and watch a favorite match video by opening and running the commentary client. In some embodiments of the present disclosure, a user performs a trigger operation for a video portal that the user wants to watch, at which time the commentary client obtains a match video stream from a service server. In some embodiments, when a user performs a trigger operation for a video portal that the user wants to watch, the commentary client may further obtain a match video stream from a commentary server.

Step S402. Obtain commentary scripts corresponding to a match data stream that matches the match video stream.

Here, implementation of step S402 may be: obtaining, from a server, the commentary scripts corresponding to the match data stream that matches the match video stream, and the server herein is the commentary server. The commentary scripts each include at least a commentary text and a commentary time point.

Step S403. Play a match video according to the match video stream.

In this embodiment of the present disclosure, when the commentary client receives only the match video stream and does not receive the commentary data, the commentary client may first buffer the match video stream, and after receiving the commentary data, decode and play the match video stream, thereby preventing the situation in which a user misses a commentary content if the commentary data has not been received during playing of the video.

Step S404. Synchronously output, based on time information corresponding to the match video which is currently played, the commentary scripts corresponding to the time information.

Here, the implementation of step S404 may be: outputting the corresponding commentary scripts when it is determined, based on the time information corresponding to the match video which is currently played, that the commentary time point is arrived, that is, outputting the commentary text in the subtitle display area of the video frame. In some embodiments, the commentary audio data may alternatively be outputted by an audio output apparatus.

In the intelligent commentary playing method provided by the embodiments of the present disclosure, when a user wants to watch a match video with a commentary through the commentary client, the commentary client obtains, in response to an operation instruction of playing a commented-on video, a match video stream to be played, and when receiving commentary data sent by a server, plays the match video stream, thereby ensuring that when the commentary time point is arrived, the commentary data is outputted synchronously when the match video is played, thereby improving the understanding and interest of audience users to the match video.

In some embodiments, the commentary script includes at least a commentary text. Correspondingly, step S404 may be implemented through the following steps.

Step S4041*a*. Determine the commentary texts corresponding to the time information based on time information corresponding to the match video which is currently played.

Step S4042*a*. Output the commentary texts in subtitle output areas of video frames during playing of the current match video.

Here, the subtitle output areas in the video frames may be preset, and output formats, such as the font, the size, and the spacing used when outputting the commentary texts may also be preset. The implementation of step S4042*a* may be: outputting the commentary texts in the subtitle output areas according to the preset output formats.

Through described step S4041*a* to step S4042*a*, text-type commentary texts can be outputted synchronously during playing of the match video stream, thereby improving the degree of understanding of the match for a user through the commentary subtitles when watching the match video.

To ensure that the user does not miss a commentary content when it is inconvenient to watch the screen, the commentary content can also be outputted by voice. At this time, the commentary script may include commentary audio data, expression information, and action information. Correspondingly, step S404 may be implemented by the following steps.

Step S4041*b*. Determine, based on the time information corresponding to the match video which is currently played, commentary audio data, expression information, and action information corresponding to the time information.

Step S4042*b*. Play the commentary audio data, and synchronously drive a virtual person in a commentary page based on the expression information and the action information.

Here, when the step S4042*b* is implemented, a virtual person program is controlled by using the expression information and the action information in the commentary scripts, to deduce the commentary audio data with expressions and actions closer to that of a real person commentator, to achieve a realistic commenting effect, thereby improving the user's watching experience of the commented-on video.

Figure 5:
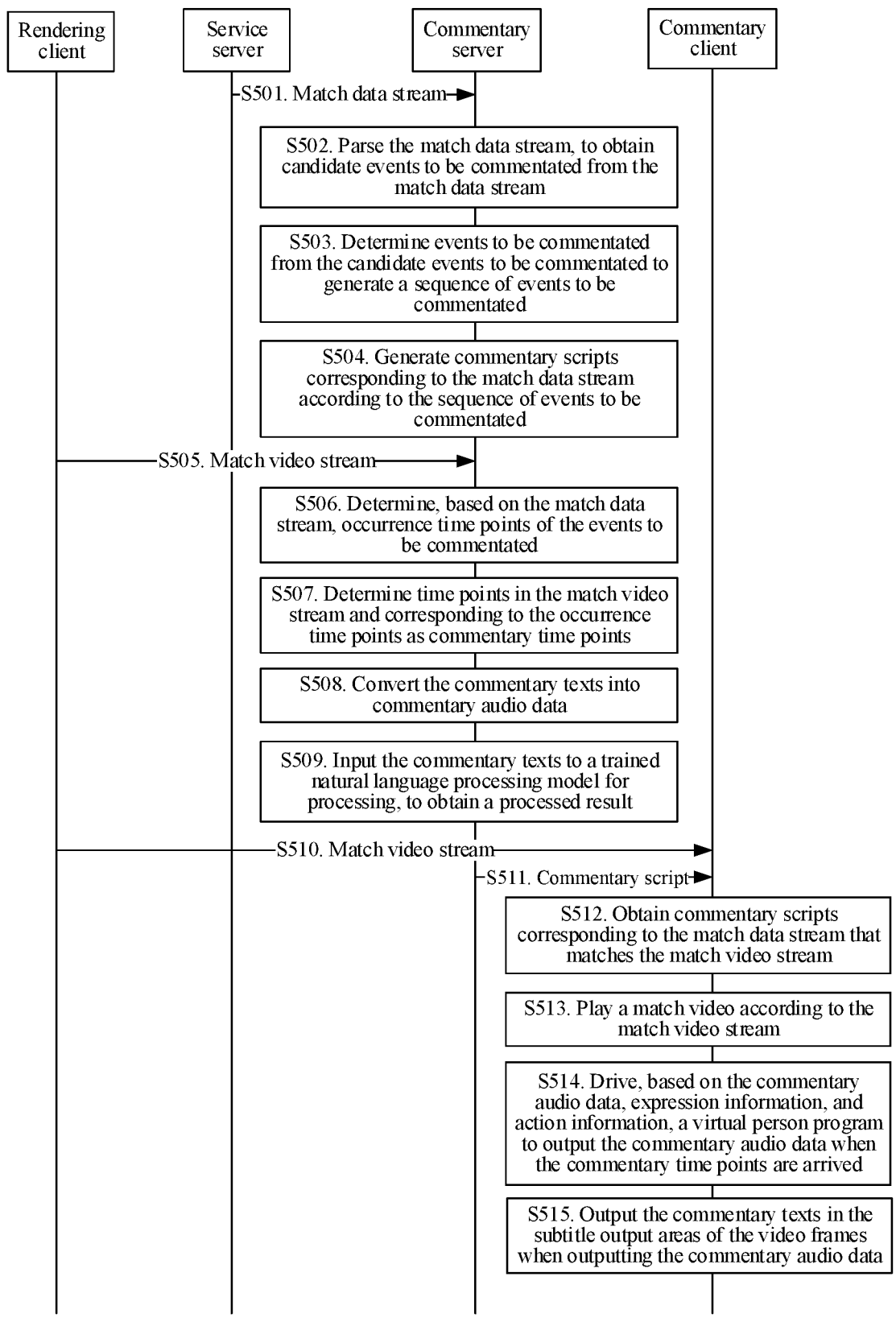
FIG. 5 is a schematic flowchart of an implementation for generating and playing an intelligent commentary according to one or more embodiments of the present disclosure.

Based on the embodiments, an embodiment of the present disclosure further provides intelligent commentary generation and playing methods. FIG. 5 is a schematic flowchart of an implementation of a method for generating and playing an intelligent commentary according to an embodiment of the present disclosure. As shown in FIG. 5, the process includes the following steps.

Step S501. A commentary server obtains, from a service server, a match data stream to be processed.

Here, the service server may be a game server, or may be a server of other video implementations.

Step S502. The commentary server parses the match data stream, to obtain candidate events to be commented on from the match data stream.

In this embodiment of the present disclosure, the implementation of the step may be: matching the match data stream to be processed with preset event matching strategies, and when the match data stream and an event matching strategy satisfy a matching condition, determining an event corresponding to the event matching strategy as a recognized candidate event to be commented on.

Step S503. The commentary server determines events to be commented on from the candidate events to be commented on, to generate a sequence of events to be commented on.

Here, the implementation of step S503 may be: determining, based on importance degree parameters of a plurality of candidate events to be commented on, events to be commented on, and in some embodiments of the present disclosure, may be: using a preset event that satisfies an event extraction condition among the plurality of candidate events to be commented on as an event to be commented on. For example, the event extraction condition may be: being an event having the highest importance degree.

Step S504. The commentary server determines commentary texts corresponding to the match data stream according to the generated sequence of events to be commented on.

Here, the implementation of step S504 may be: first obtaining attribute information of the events to be commented on, and then generating the commentary texts corresponding to the events to be commented on based on commentary content generation strategies.

Step S505. The commentary server obtains a match video stream corresponding to the match data stream.

Here, the match video stream is rendered by using the match data stream.

Step S506. The commentary server determines, based on the match data stream, occurrence time points of the events to be commented on.

Each data frame in the match data stream carries time information, and therefore the occurrence time point of the event to be commented on can be determined according to the time information carried by the data frame corresponding to the event to be commented on.

Step S507. The commentary server determines time points in the match video stream and corresponding to the occurrence time points as commentary time points.

Here, the match video stream and the match data stream are generally from different devices, or even if the match video stream and the match data stream are from the same device, contents such as an advertisement or video introduction may be added during playing of the match video stream, which results in that the time of the match video stream is not aligned with that of the match data stream. Therefore, after determining the occurrence time points of the events to be commented on, it is further desirable to determine the time points corresponding to the occurrence time points in the match video stream as the commentary time points.

Step S508. The commentary server converts the commentary texts into commentary audio data.

The actual implementation may be: converting the commentary texts into commentary audio data by using a TTS service.

Step S509. The commentary server inputs the commentary texts to a trained natural language processing model for processing, to obtain a processed result.

Here, the processed result includes at least expression information and action information corresponding to the commentary texts.

Step S510. A commentary client obtains, in response to an operation instruction of playing a commented-on video, a match video stream to be played.

Here, step S510 may be performed before any step between step S501 and step S509.

Step S511. The commentary server transmits the commentary scripts to the commentary client.

Here, the commentary scripts may include the commentary texts, the commentary audio data, the expression information, the action information, and the commentary time points obtained in the described steps.

Step S512. The commentary client obtains the commentary scripts corresponding to the match data stream that matches the match video stream.

Step S513. The commentary client plays a match video according to the match video stream.

When the commentary client receives only the match video stream and does not receive the commentary scripts, the commentary client may first buffer the match video stream, and after receiving the commentary scripts, decode and play the match video stream, thereby preventing the situation in which a user misses a commentary content if the commentary scripts have not been received during playing of the video.

Step S514. The commentary client drives, based on the commentary audio data, the expression information, and the action information, a virtual person program to output the commentary audio data when the commentary time points are arrived.

Step S515. The commentary client outputs the commentary texts corresponding to the commentary audio data in the subtitle output areas of the video frames when outputting the commentary audio data.

The steps or concepts in this embodiment of the present disclosure that are the same as those in other embodiments may be referred to the relevant descriptions in the other embodiments.

In the intelligent commentary generation and playing methods provided by the embodiments of the present disclosure, after obtaining the match data stream to be processed, the process of recognizing a preset event from the match data stream is performed by parsing the match data stream, the preset events are extracted from the plurality of preset events, the events to be commented on are recognized from the preset events, commentary texts corresponding to the events to be commented on are further generated, finally the commentary texts are processed to obtain commentary data, and the commentary data is transmitted to the client. In this way, the commentary data can be more automatically and more accurately generated according to the match data, so that the commenting efficiency and the commenting accuracy can be improved. When a user wants to watch a match video with a commentary through the commentary client, the commentary client obtains, in response to an operation instruction of playing a commented-on video, a match video stream to be played, and when receiving commentary data sent by a server, plays the match video stream, thereby ensuring that when the commentary time point is arrived, the commentary data is outputted synchronously when the match video is played, thereby improving the understanding and interest of audience users to the match video.

An exemplary implementation of the embodiments of the present disclosure in a practical implementation scenario will be described below by using a MOBA match commentary as an example in this embodiment of the present disclosure.

To better understand this embodiment of the present disclosure, a MOBA match and a MOBA match commentary are first described.

The MOBA games are a type of enduring games in the game market. The competitive attributes of the MOBA games have spawned a variety of professional competitions, and an indispensable part of competitive games is game commentary. A good game commentary may enhance players' understanding of the game and drive players' enthusiasm for playing games, thereby promoting a virtuous circle of the MOBA game ecology.

A competition commentator can make a wonderful and more accurate commentary on a game after having had a detailed understanding of all types of data in the game (data storage and memory) and analyzing all types of events in the game process in real time (real-time data analysis), combined with the understanding of various modes of the game (mode recognition).

At present, real person commentators may includes official commentators and game anchor commentators. There are usually a few of designated official commentators, and the number of commented-on competitions is limited. The commentaries by game anchors may be in the form of commenting during playing, which may lead to insufficient observation of the game.

Based on this, in this embodiment of the present disclosure, the commentary contents obtained by the AI and the NLP are used to drive virtual persons to automatically comment on the MOBA games in real time, so as to comment on any game match and provide more diversified and more attractive commentary contents for players.

By using the AI and NLP technologies, various types of game data (including all historical battle data and real-person commentary contents) can be more fully and accurately stored and memorized, and real-time data of a game can be more accurately obtained and analyzed, to recognize some modes (events) in the process of the game, to further generate commentary contents by using the NLP. To provide a more anthropomorphic commenting effect, the virtual person technology is also applied to this embodiment of the present disclosure. After a commentary text is generated, the text is analyzed by using the NLP to generate an expression and an action corresponding to the commentary text, thereby enabling the commenting effect to be more real.

Figure 6:
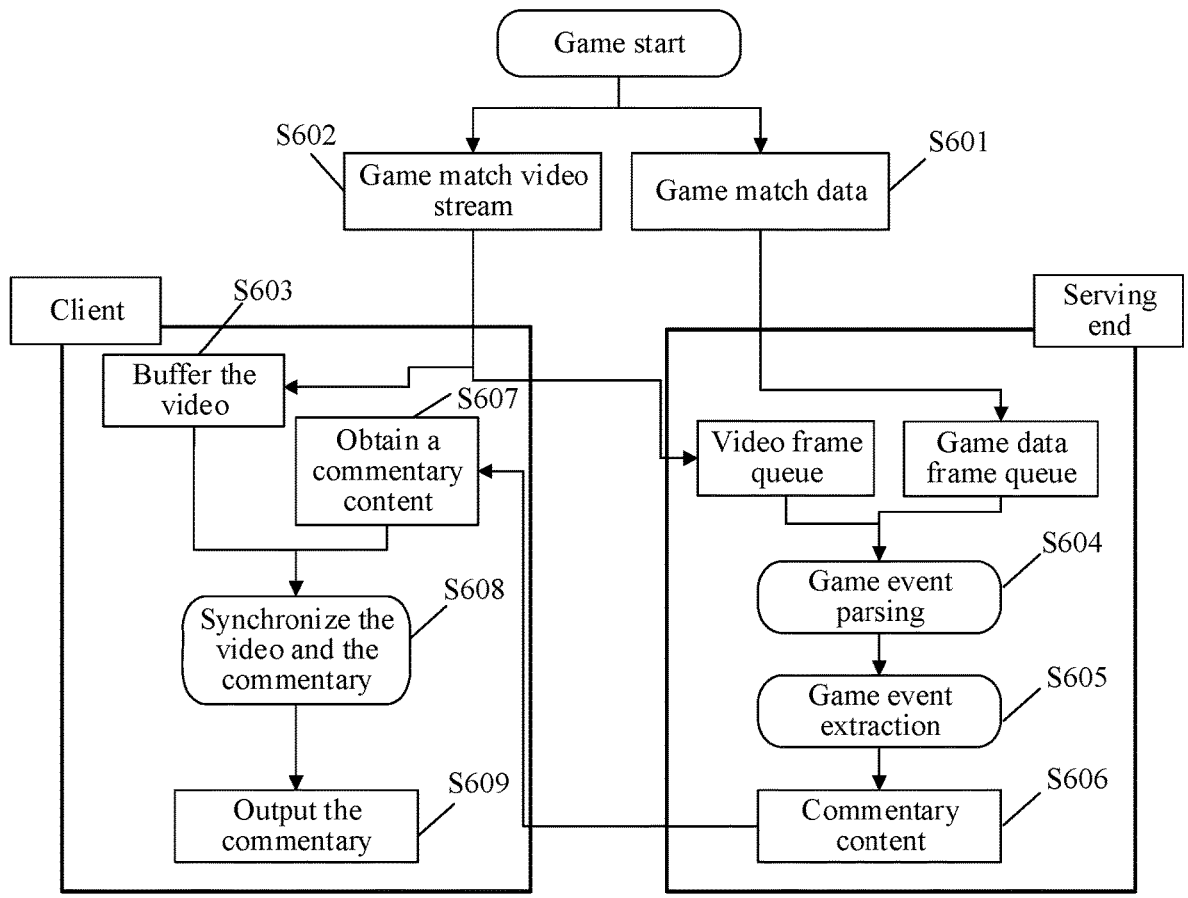
FIG. 6 is a schematic flowchart of another implementation for generating and playing an intelligent commentary according to one or more embodiments of the present disclosure.

FIG. 6 is a schematic flowchart of another implementation for generating and playing an intelligent commentary according to an embodiment of the present disclosure. As shown in FIG. 6, the process includes the following steps.

Step S601. A game server transmits a game match data stream to a commentary serving end.

Step S602. A game dedicated client transmits the game match data stream to a commentary client and the commentary serving end.

Here, after a game match starts, a commentary system may obtain a video stream and a data stream corresponding to the game match, where the video stream may be pushed to both the commentary client and the commentary serving end.

Step S603. The commentary client buffers the video stream and waits for a commentary to be generated.

Step S604. The commentary server performs game event parsing based on a game data frame queue and a video frame queue that are received, to obtain game events.

Here, the key of game commenting lies in the understanding of real-time game data, and abstracting and generalizing underlying game data to obtain various game events that can be intuitively understood by the audience. In the implementation, matching may be performed on the game data and preset event matching rules, to obtain events that meet matching conditions with the event matching rules. In some embodiments, the commentary serving end may further parse the video stream to obtain information such as game time and perspectives of the game.

Step S605. The commentary serving end extracts a game event.

Here, in general, more than one game event can be obtained by abstracting and generalizing the underlying game data and only one game event can be commented on at a time during commenting, and therefore it is desirable to determine, based on importance degrees of the game events, a game event to be extracted. In this embodiment of the present disclosure, the game event with the highest importance degree is extracted, and the finally extracted event is used as a source of commentary content generated in the subsequent process.

Step S606. The commentary serving end generates a commentary content based on the extracted game event.

Here, after step S605, an optimal sequence of events to be commented on can be obtained, game events are extracted according to the sequence of events to be commented on, and then commentary contents may need to be generated according to the extracted game events. The implementation may be: generating commentary contents from the extracted game events according to a commentary content generation strategy, where the commentary content generation strategy is derived from real commentary data (that is, real person historical commentary data), and the commentary data can be obtained from at least the following channels:

a. real commentary data of historical events; and
b. knowledge arranged by professional commentators In the embodiments of the present disclosure, the commentary generation strategy may be continuously updated and optimized with the abundance of historical commentary data, thereby ensuring the diversity and freshness of the commentary contents. The coherence and context relevance of the commentaries may need to be considered when generating commentary contents, that is, there should be no long-term vacancy in commentary deduction, and the commentary contents should echo back and forth, and advance layer by layer as the game goes on. After the commentary contents are generated, corresponding expressions and actions may be obtained by using a Natural Language Understanding (NLU) processing module, thereby driving a virtual person to make a commentary.

Step S607. The commentary serving end transmits the commentary contents to the commentary client.

Step S608. The commentary client synchronizes the buffered video and the commentary contents.

Step S609. The commentary client outputs the commentary contents during playing of the video.

Figure 7:
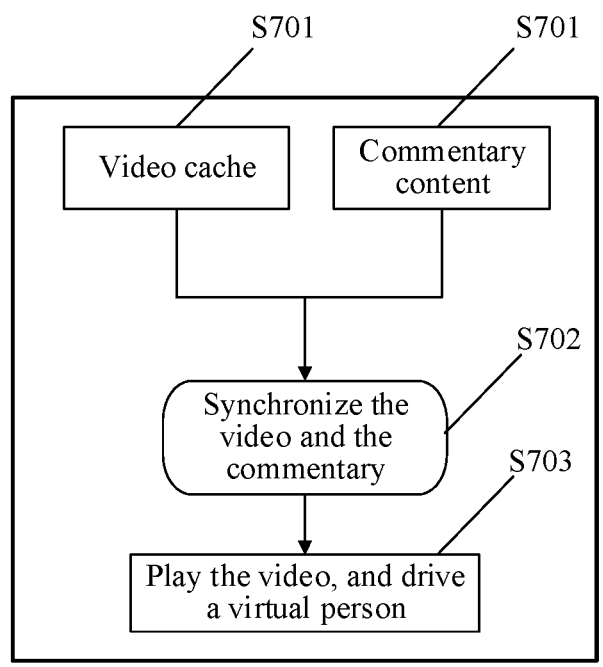
FIG. 7 is a schematic flowchart of an implementation for driving a virtual person to make a commentary according to one or more embodiments of the present disclosure.

In this embodiment of the present disclosure, after obtaining the commentary contents returned by the commentary serving end, the commentary client buffers the commentary content and then drives the virtual person to deduct the commentary contents (including texts, actions, expressions, or the like). The virtual person is a virtual character presented by 3-dimension (3D) modeling. The virtual person simulates a real person as truly as possible and achieves a real commenting effect through anthropomorphic pronunciation, precise mouth shapes, vivid expressions, and natural actions. FIG. 7 is a schematic flowchart of an implementation for driving a virtual person to make a commentary according to an embodiment of the present disclosure. As shown in FIG. 7, the process includes the following steps.

Step S701. A commentary client obtains a commentary content and plays a game video which is currently buffered.

Step S702. The commentary client aligns the commentary content and a video content.

Step S703. Drive, when it is detected that a time point for playing the commentary content is arrived during playing of the video content, a virtual person to deduct the commentary content.

In this way, deduction of the corresponding commentary content can be triggered at a more accurate time point, thereby performing commenting of the game.

In the implementation process, after a game data stream is pushed to the commentary serving end, the commentary serving end analyzes and makes decisions on the game data stream, generates a commentary content, and pushes the commentary content to the commentary client. After receiving the commentary content, the commentary client plays a buffered video stream and presents the commentary content at the corresponding time point.

Figure 8:
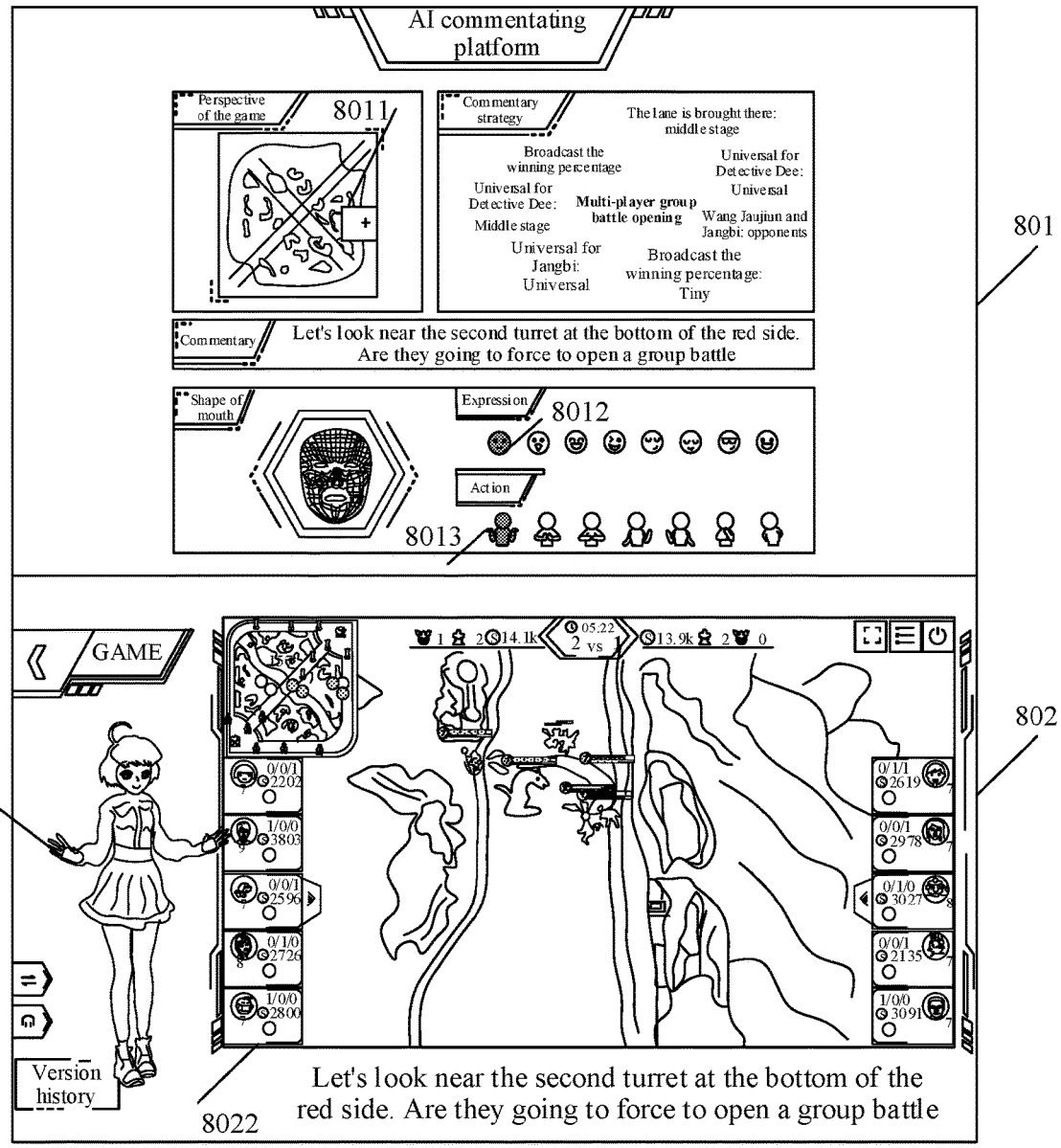
FIG. 8 is a schematic diagram of a client interface according to one or more embodiments of the present disclosure.

FIG. 8 is a schematic diagram of a client interface according to an embodiment of the present disclosure. In this embodiment of the present disclosure, a client display interface includes two parts, respectively, a commentary strategy interface 801 and a commentary display interface 802. The commentary strategy interface 801 is configured to display some data related to a current commentary strategy, and the commentary display interface 802 displays a final commentary.

As shown in the commentary strategy interface 801 in FIG. 8, during progressing of a game, the commentary serving end parses real-time game data, to obtain events that occur at a time point (such as the exemplary game time in the figure: 05:22) within a range (such as the area 8011 in FIG. 801) of the map, then obtains, according to a sorting rule, an event that is most suitable for being commented on at the time point (for example, "multi-player group battle opening"), obtains a commentary (for example, the obtained commentary is: "Let's look near the second turret at the bottom of the red side. Are they going to force to open a group battle?") in combination with all the factors currently determined (for example, including a character object corresponding to the event and a place corresponding to the event), then determines an appropriate expression and action (such as the yellow highlighted expression 8012 and action icon 8013 in 801) according to the commentary content, and at the same time obtains audio data and shape of mouth data corresponding to the commentary through a TTS service.

After the text content, the audio data, the shape of mouth data, the expression information, and the action of the commentary are obtained, a virtual person 8021 in the commentary display interface 802 of the client may make a commentary according to the above-obtained commentary data and output and display the game video in 8022 in the commentary display interface.

Figure 9:
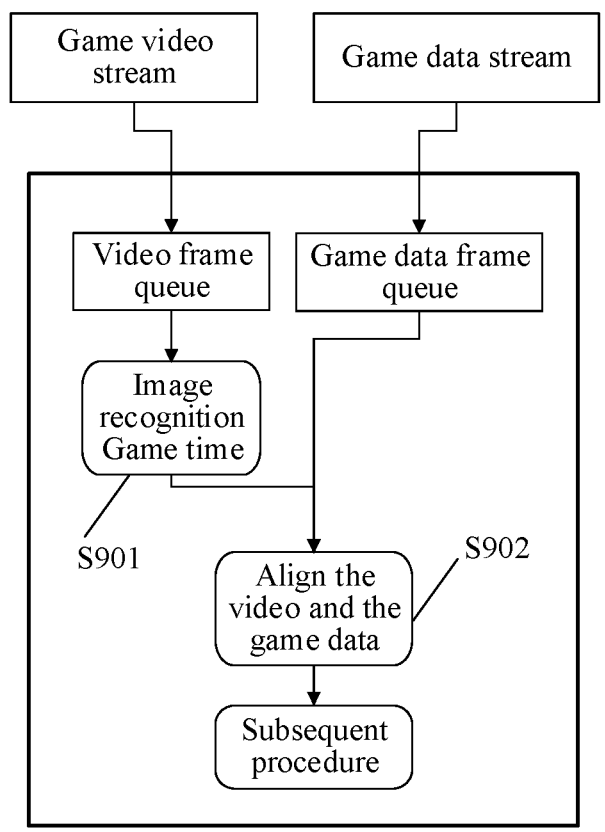
FIG. 9 is a schematic flowchart of an implementation for aligning a video frame queue and a game data frame queue according to one or more embodiments of the present disclosure.

Sources of the video stream and the data stream are independent of each other, and there is no one-to-one correspondence between the video frame and the data frame. Therefore, it is desirable to align the video frame and the data frame before generating the commentary content. FIG. 9 is a schematic flowchart of an implementation of aligning a video frame queue and a game data frame queue according to an embodiment of the present disclosure. As shown in FIG. 9, the process includes the following steps.

Step S901. Obtain a game time corresponding to each video frame by image recognition.

Here, the game time is displayed in a preset area of the video frame, so that image information in the preset area of each video frame can be recognized by image recognition, thereby obtaining the game time corresponding to each video frame.

Step S902. Align a video stream and a data stream based on the recognized game time.

Here, time information is carried in each data frame of the data stream, and therefore after the game time in the video stream is recognized, the video stream and the data stream can be aligned based on the recognized game time and the data information carried in each data frame.

In some embodiments, rendering and driving of a virtual person can alternatively be moved to a serving end, so that the virtual commenting is server-oriented, which can improve the flexibility and scalability of the system and reduce the dependence on the client.

Through this embodiment of the present disclosure, the presentation forms of the game commenting can be enriched, so that the players have more choices, and the novel presentation form of the virtual person can attract players who are interested in the form. In addition, the game commenting is further enabled to be automatic. For some competitions involving scheduling conflict or competitions that are relatively unpopular, of which the official may probably not be able to take care, virtual commenting can make up for this vacancy, so that all competitions can be commented on, and even any game match played by any player can be commented on, so that a player can watch a commentary of any game match.

In this embodiment of the present disclosure, the virtual person is combined with the MOBA game and is enabled to get in touch with the vast MOBA players, thereby injecting vitality into the development of virtual persons, which can not only enrich the implementation scenarios of virtual persons, but also have advantages over real-person commenting on some aspects, such as enhanced neutrality to both sides of the competition, more controllable emotions, more accurate data sources, and more reliable data memory, thereby capable of bringing about more accurate and credible commenting. In addition, virtual commenting can produce more valuable content for the games, which can greatly enrich the output of the surrounding content of the games, thereby promoting a more virtuous development of the game ecology and enhancing the attraction of the games to the players.

The following continuously describes an exemplary structure in which an intelligent commentary generation apparatus 80 provided by an embodiment of the present disclosure is implemented as a software module. In some embodiments, As shown in FIG. 2, the software module stored in the intelligent commentary generation apparatus 80 of the memory 240 may include: a first obtaining module 81, configured to obtain a match data stream to be commented on; a first parsing module 82, configured to parse the match data stream, to obtain candidate events to be commented on from the match data stream; a first determining module 83, configured to determine events to be commented on from the candidate events to be commented on, to generate a sequence of events to be commented on; and a first generation module 84, configured to generate commentary scripts corresponding to the match data stream according to the sequence of events to be commented on.

In some embodiments, the first determining module 83 is further configured to: obtain time periods in which the candidate events to be commented on occur and importance degree parameters of the candidate events to be commented on; determine, based on the time periods in which the candidate events to be commented on occur, sets of candidate events to be commented on corresponding to the time periods; and determine, based on the importance degree parameters of the candidate events to be commented on, events to be commented on corresponding to the time periods from the sets of candidate events to be commented on corresponding to the time periods, to obtain the sequence of events to be commented on.

In some embodiments, the first generation module 84 is further configured to: obtain attribute information of each event to be commented on in the sequence of events to be commented on, where the attribute information includes at least a place where the event to be commented on occurs and character information corresponding to the event to be commented on; obtain a commentary content generation strategy corresponding to each event to be commented on; generate commentary texts based on the commentary content generation strategies and the attribute information; and generate, based on the commentary texts, the commentary scripts corresponding to the events to be commented on.

In some embodiments, the commentary scripts include commentary audio data, expression information, and action information, and the generating, based on the commentary texts, the commentary scripts corresponding to the events to be commented on includes: converting the commentary texts into commentary audio data; and inputting the commentary texts to a trained natural language processing model for processing to obtain expression information and action information corresponding to each commentary text.

In some embodiments, the apparatus further includes: a fourth obtaining module, configured to obtain a match video stream corresponding to the match data stream, where the match video stream is rendered by using the match data stream; a second determining module, configured to determine, based on the match data stream, occurrence time points of the events to be commented on; a third determining module, configured to determine time points in the match video stream and corresponding to the occurrence time points as commentary time points of the events to be commented on; and a first transmitting module, configured to transmit the commentary scripts and the commentary time points corresponding to the events to be commented on to a client.

In some embodiments, the apparatus further includes: a fifth obtaining module, configured to obtain video frames from the match video stream; an image recognition module, configured to perform image recognition on the video frames, to obtain service time information corresponding to the video frames; a sixth obtaining module, configured to obtain playing time information corresponding to the video frames; and a time alignment module, configured to establish a correspondence between the service time information and the playing time information of each video frame, to perform time alignment between the match data stream and the match video stream.

In some embodiments, the apparatus further includes: a seventh obtaining module, configured to obtain commentary durations of the events to be commented on; a fourth determining module, configured to determine a commentary time difference based on commentary time points and commentary durations corresponding to two adjacent events to be commented on; a fifth determining module, configured to determine a supplementary commentary script based on the two adjacent events to be commented on and the commentary time difference, when or in response to determining that the commentary time difference is greater than a difference threshold; and a second transmitting module, configured to transmit the supplementary commentary script to a client.

Based on the embodiments, this embodiment of the present disclosure further provides an intelligent commentary playing apparatus, including: a second obtaining module, configured to obtain, in response to an operation instruction of playing a commented-on match video, a match video stream to be commented on; a third obtaining module, configured to obtain commentary scripts corresponding to a match data stream that matches the match video stream; a video playing module, configured to play the match video according to the match video stream; and an output module, configured to synchronously output, based on time information corresponding to the match video which is currently played, the commentary scripts corresponding to the time information.

In some embodiments, the commentary scripts each include at least a commentary text; and the output module is further configured to: determine the commentary texts corresponding to the time information based on the time information corresponding to the match video which is currently played; and output the commentary texts in subtitle output areas of video frames during playing of the current match video.

In some embodiments, the commentary scripts include commentary audio data, expression information, and action information; and correspondingly, the output module is further configured to: determine, based on the time information corresponding to the match video which is currently played, commentary audio data, expression information, and action information corresponding to the time information; and play the commentary audio data, and synchronously drive a virtual person in a commentary page based on the expression information and the action information.

An embodiment of the present disclosure further provides a storage medium, storing executable instructions, the executable instructions, when executed by a processor, causing the processor to implement the methods provided by the embodiments of the present disclosure, for example, the methods shown in FIG. 3, FIG. 4, FIG. 5, and FIG. 6.

In some embodiments, the storage medium includes, but is not limited to, a U disk, a removable hard disk, a read-only memory (ROM), a random-access memory (RAM), a magnetic disk memory, a CD-ROM, an optical memory, and the like.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a hypertext markup language (HTML) file, stored in a file that is specially used for a program in discussion, or stored in the plurality of collaborative files (for example, be stored in files of one or modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

The term unit (and other similar terms such as subunit, module, submodule, etc.) in this disclosure may refer to a software unit, a hardware unit, or a combination thereof. A software unit (e.g., computer program) may be developed using a computer programming language. A hardware unit may be implemented using processing circuitry and/or memory. Each unit can be implemented using one or more processors (or processors and memory). Likewise, a processor (or processors and memory) can be used to implement one or more units. Moreover, each unit can be part of an overall unit that includes the functionalities of the unit.

The descriptions are merely embodiments of the present disclosure and are not intended to limit the protection scope of the present disclosure. Any modification, equivalent replacement, or improvement made without departing from the spirit and range of the present disclosure shall fall within the protection scope of the present disclosure.

INDUSTRIAL PRACTICABILITY

In the embodiments of the present disclosure, a match data stream to be commented on is obtained; the match data stream is parsed, to obtain candidate events to be commented on from the match data stream; events to be commented on are determined from the candidate events to be commented on, to generate a sequence of events to be commented on; and commentary scripts corresponding to the match data stream are generated according to the sequence of events to be commented on. Through the present disclosure, the commentary data can be automatically generated according to the match data stream, so that the commenting efficiency can be improved.

What is claimed is:

1. An intelligent commentary generation method, applied to an intelligent commentary generation device, the method comprising:
    obtaining a match data stream;
    parsing the match data stream, to obtain candidate events from the match data stream;
    determining events from the candidate events, to generate a sequence of events;
    generating commentary scripts corresponding to the match data stream according to the sequence of events;
    obtaining a match video stream corresponding to the match data stream, wherein the match video stream is rendered by using the match data stream;
    determining, based on the match data stream, occurrence time points of the events;
    determining time points in the match video stream and corresponding to the occurrence time points as commentary time points of the events; and
    transmitting the commentary scripts and the commentary time points corresponding to the events to a client.

2. The method according to claim 1, wherein determining the events comprises:
    obtaining time periods in which the candidate events occur and importance degree parameters of the candidate events;
    determining, based on the time periods in which the candidate events occur, sets of candidate events corresponding to the time periods; and
    determining, based on the importance degree parameters of the candidate events, events corresponding to the time periods from the sets of candidate events corresponding to the time periods, to obtain the sequence of events.

3. The method according to claim 1, wherein generating the commentary scripts corresponding to the match data stream comprises:
    obtaining attribute information of each event in the sequence of events, wherein the attribute information includes at least a place where the event occurs and character information corresponding to the event;
    obtaining a commentary content generation strategy corresponding to each event;
    generating commentary texts based on the commentary content generation strategies and the attribute information; and
    generating, based on the commentary texts, the commentary scripts corresponding to the events.

4. The method according to claim 3, wherein the commentary scripts include commentary audio data, expression information, and action information, and wherein generating the commentary scripts corresponding to the events comprises:
    converting the commentary texts into commentary audio data; and
    inputting the commentary texts to a trained natural language processing model for processing to obtain expression information and action information corresponding to each commentary text.

5. The method according to claim 1, further comprising:
    obtaining video frames from the match video stream;
    performing image recognition on the video frames, to obtain service time information corresponding to the video frames;
    obtaining playing time information corresponding to the video frames; and
    establishing a correspondence between the service time information and the playing time information of each video frame, to perform time alignment between the match data stream and the match video stream.

6. The method according to claim 1, further comprising:
    obtaining commentary durations of the events;
    determining a commentary time difference based on commentary time points and commentary durations corresponding to two adjacent events;
    determining a supplementary commentary script based on the two adjacent events and the commentary time difference in response to determining that the commentary time difference is greater than a difference threshold; and
    transmitting the supplementary commentary script to a client.

7. An intelligent commentary generation apparatus, comprising: a memory storing computer program instructions; and a processor coupled to the memory and configured to execute the computer program instructions and perform:
  obtaining a match data stream;
  parsing the match data stream, to obtain candidate events from the match data stream;
  determining events from the candidate events, to generate a sequence of events;
  generating commentary scripts corresponding to the match data stream according to the sequence of events;
  obtaining a match video stream corresponding to the match data stream, wherein the match video stream is rendered by using the match data stream;
  determining, based on the match data stream, occurrence time points of the events;
  determining time points in the match video stream and corresponding to the occurrence time points as commentary time points of the events; and
  transmitting the commentary scripts and the commentary time points corresponding to the events to a client.

8. The apparatus according to claim 7, wherein determining the events comprises:
  obtaining time periods in which the candidate events occur and importance degree parameters of the candidate events;
  determining, based on the time periods in which the candidate events occur, sets of candidate events corresponding to the time periods; and
  determining, based on the importance degree parameters of the candidate events, events to be commented on corresponding to the time periods from the sets of candidate events corresponding to the time periods, to obtain the sequence of events.

9. The apparatus according to claim 7, wherein generating the commentary scripts corresponding to the match data stream comprises:
  obtaining attribute information of each event in the sequence of events, wherein the attribute information includes at least a place where the event occurs and character information corresponding to the event;
  obtaining a commentary content generation strategy corresponding to each event;
  generating commentary texts based on the commentary content generation strategies and the attribute information; and
  generating, based on the commentary texts, the commentary scripts corresponding to the events.

10. The apparatus according to claim 9, wherein the commentary scripts include commentary audio data, expression information, and action information, and wherein generating the commentary scripts corresponding to the events comprises:
  converting the commentary texts into commentary audio data; and
  inputting the commentary texts to a trained natural language processing model for processing to obtain expression information and action information corresponding to each commentary text.

11. The apparatus according to claim 7, wherein the processor is further configured to execute the computer program instructions and perform:
  obtaining video frames from the match video stream;
  performing image recognition on the video frames, to obtain service time information corresponding to the video frames;
  obtaining playing time information corresponding to the video frames; and
  establishing a correspondence between the service time information and the playing time information of each video frame, to perform time alignment between the match data stream and the match video stream.

12. The apparatus according to claim 7, wherein the processor is further configured to execute the computer program instructions and perform:
  obtaining commentary durations of the events;
  determining a commentary time difference based on commentary time points and commentary durations corresponding to two adjacent events;
  determining a supplementary commentary script based on the two adjacent events and the commentary time difference in response to determining that the commentary time difference is greater than a difference threshold; and
  transmitting the supplementary commentary script to a client.

13. A non-transitory computer-readable storage medium storing computer program instructions executable by at least one processor to perform:
  obtaining a match data stream;
  parsing the match data stream, to obtain candidate events from the match data stream;
  determining events to be commented on from the candidate events, to generate a sequence of events;
  generating commentary scripts corresponding to the match data stream according to the sequence of events;
  obtaining a match video stream corresponding to the match data stream, wherein the match video stream is rendered by using the match data stream;
  determining, based on the match data stream, occurrence time points of the events;
  determining time points in the match video stream and corresponding to the occurrence time points as commentary time points of the events; and
  transmitting the commentary scripts and the commentary time points corresponding to the events to a client.

14. The non-transitory computer-readable storage medium according to claim 13, wherein determining the events includes:
  obtaining time periods in which the candidate events occur and importance degree parameters of the candidate events;
  determining, based on the time periods in which the candidate events occur, sets of candidate events corresponding to the time periods; and
  determining, based on the importance degree parameters of the candidate events, events corresponding to the time periods from the sets of candidate events corresponding to the time periods, to obtain the sequence of events.

15. The non-transitory computer-readable storage medium according to claim 13, wherein generating the commentary scripts corresponding to the match data stream comprises:
  obtaining attribute information of each event in the sequence of events, wherein the attribute information includes at least a place where the event occurs and character information corresponding to the event;
  obtaining a commentary content generation strategy corresponding to each event;
  generating commentary texts based on the commentary content generation strategies and the attribute information; and generating, based on the commentary texts, the commentary scripts corresponding to the events to be commented on.

16. The non-transitory computer-readable storage medium according to claim 15, wherein the commentary scripts include commentary audio data, expression information, and action information, and wherein generating the commentary scripts corresponding to the events includes:
converting the commentary texts into commentary audio data; and
inputting the commentary texts to a trained natural language processing model for processing to obtain expression information and action information corresponding to each commentary text.

17. The non-transitory computer-readable storage medium according to claim 13, wherein the computer program instructions are further executable by the at least one processor to perform:
obtaining video frames from the match video stream;
performing image recognition on the video frames, to obtain service time information corresponding to the video frames;
obtaining playing time information corresponding to the video frames; and
establishing a correspondence between the service time information and the playing time information of each video frame, to perform time alignment between the match data stream and the match video stream.

* * * * *